US00RE39488E

(19) United States
(12) Reissued Patent
Park et al.

(10) Patent Number: US RE39,488 E
(45) Date of Reissued Patent: *Feb. 13, 2007

(54) PLASMA DISPLAY PANEL

(75) Inventors: Hun Gun Park, Kyongsangbuk-do (KR); Seok Cheon Ha, Kyongsangnam-do (KR)

(73) Assignee: LG Electronics Inc., Seoul (KR)

( * ) Notice: This patent is subject to a terminal disclaimer.

(21) Appl. No.: 10/445,868

(22) Filed: May 28, 2003

Related U.S. Patent Documents

Reissue of:
(64) Patent No.: 6,479,935
Issued: Nov. 12, 2002
Appl. No.: 09/717,069
Filed: Apr. 18, 2001

(30) Foreign Application Priority Data

Nov. 24, 1999 (KR) ..... P1999-52532
Jan. 4, 2000 (KR) ..... P2000-151
Jan. 17, 2000 (KR) ..... P2000-2069
Jan. 17, 2000 (KR) ..... P2000-2070

(51) Int. Cl.
*H01J 17/49* (2006.01)

(52) U.S. Cl. ..... 313/586; 313/292; 313/587
(58) Field of Classification Search ..... 313/581, 313/582, 584, 585, 586, 587, 292, 485; 315/169.4
See application file for complete search history.

(56) References Cited

U.S. PATENT DOCUMENTS 5,742,122 A 4/1998 Amemiya et al.
5,763,139 A 6/1998 Matsunaga et al.
5,909,083 A 6/1999 Asano et al.
6,008,582 A * 12/1999 Asano et al. ..... 313/582
6,249,264 B1 * 6/2001 Sano et al. ..... 345/60
6,255,780 B1 7/2001 Komaki et al.
6,278,238 B1 * 8/2001 Hong ..... 313/584
6,373,195 B1 * 4/2002 Whang et al. ..... 315/169.3
6,433,477 B1 8/2002 Ha et al.
6,492,770 B2 12/2002 Amemiya et al.
6,522,070 B1 2/2003 Nakazawa et al.
6,525,470 B1 2/2003 Amemiya
6,531,820 B1 3/2003 Lee et al.
6,787,978 B2 9/2004 Yura et al.

FOREIGN PATENT DOCUMENTS

JP 5-41165 2/1993
JP 06-060815 3/1994
JP 1994-60815 3/1994
JP 07-312178 * 11/1995
JP 08-096714 * 4/1996
JP 1997-213215 8/1997
JP 11-096919 4/1999
JP 11-233026 8/1999
JP 11-260264 * 9/1999
JP 11-297209 10/1999
JP 11-297215 10/1999
KR 1998-5233 * 3/1998

OTHER PUBLICATIONS

Japanese Search Report dated Jan. 25, 2005.
PDP Paper, Nikkei Electronics, dated Oct. 4, 1999; vol. 753, pp. 153–162 and English–language Abstract.

* cited by examiner

*Primary Examiner*—Karabi Guharay
(74) *Attorney, Agent, or Firm*—Fleshner & Kim, LLP

(57) ABSTRACT

A plasma display panel is disclosed, which prevents luminance from being reduced, prevents error discharge from occurring due to crosstalk, and improves exhaust ability. Auxiliary barriers or projections are formed in a boundary portion between respective cells in a stripe type barrier structure. Alternatively, a predetermined groove is formed in a predetermined position of a dielectric layer in a lattice shaped barrier structure. In addition to these barriers, second barriers are formed at a greater width or at constant intervals. Thus, exhaust ability can be improved, and error discharge due to crosstalk can be prevented from occurring. Also, luminance in corner portions of the cell can be improved, and contrast can be improved even if a black matrix is not formed.

47 Claims, 14 Drawing Sheets

FIG.[17]16
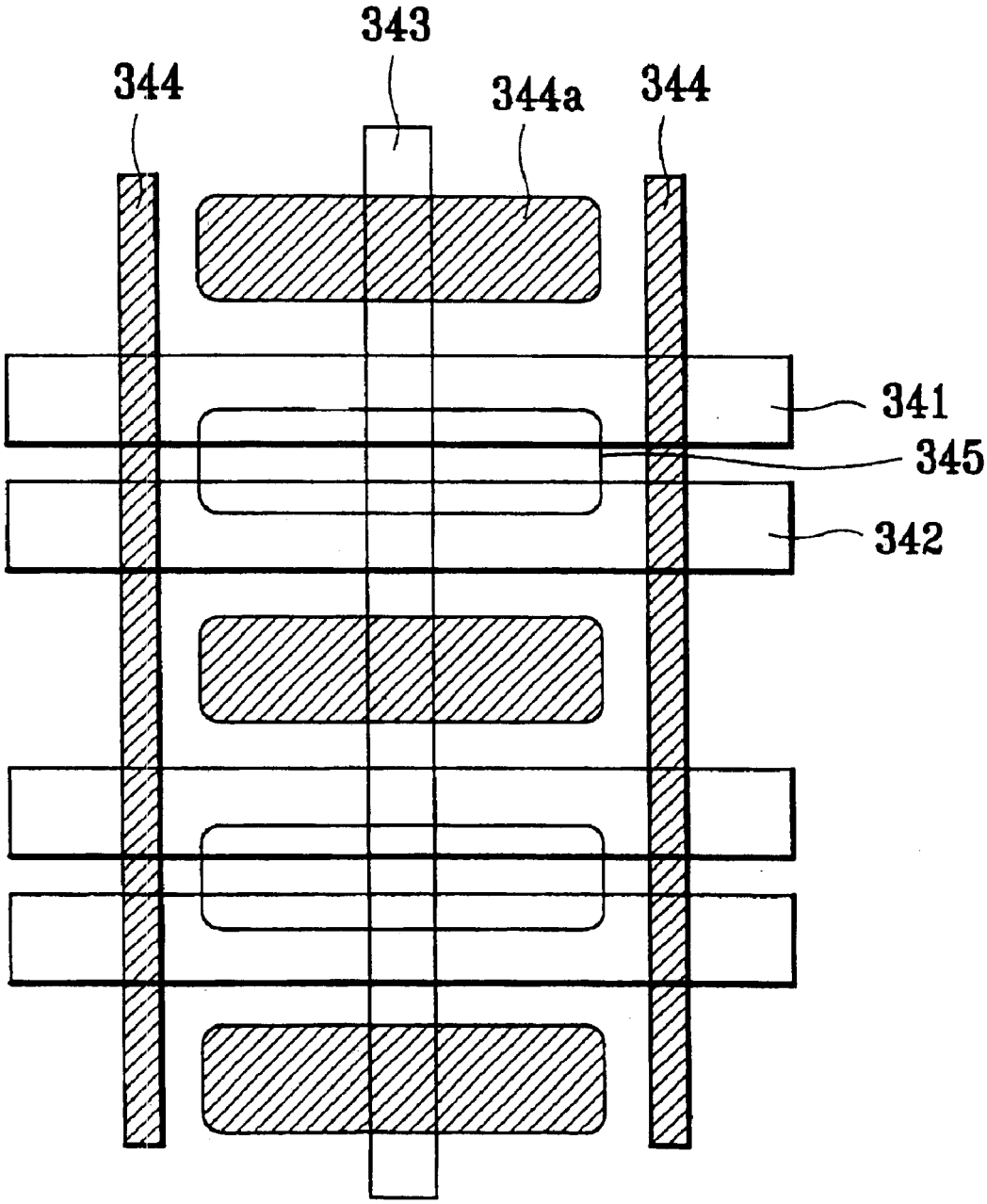
AMENDED

FIG.[18]17
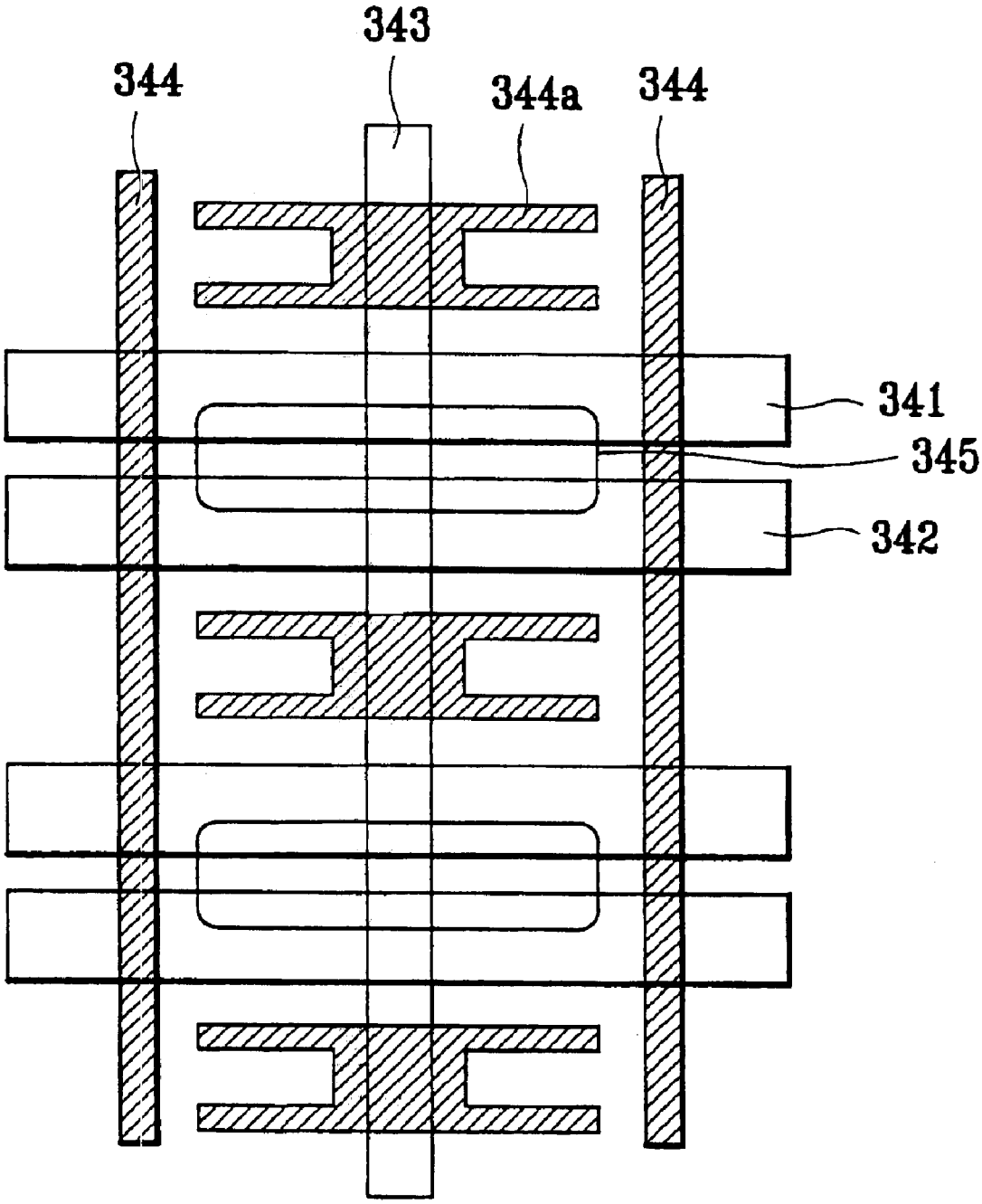
AMENDED

PLASMA DISPLAY PANEL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a plasma display panel, and more particularly, to a plasma display panel which improves emitting luminance, emitting efficiency, and exhaust ability.

2. Discussion of the Related Art

Generally, a plasma display panel which is a gas discharge display device is divided into a DC type, an AC type, and a hybrid type depending on its electrode structure. The DC type and the AC type are determined depending on exposure of the electrode to a discharge plasma. Namely, in the DC type, the electrode is directly exposed to the discharge plasma. In the AC type, the electrode is indirectly combined with the plasma through a dielectric. This difference is generated by a difference of discharge phenomenon between the DC type and the AC type. In case of the AC type, charge particles formed by discharge are staked on a dielectric layer. That is, electrons are stacked on the dielectric layer on an electrode to which positive(+) potential is applied while ions are stacked on the dielectric layer on an electrode to which negative(−) potential is applied.

A related art AC type plasma display panel of three-electrode area discharge type will be described with reference to FIG. 1.

As shown in FIG. 1, the related art plasma display panel of three-electrode area discharge type includes a first substrate 1 and a second substrate 1a. X electrode 4, Y electrode 2, and Z electrode 3 are formed in a matrix arrangement. Namely, the Y electrode 2 and the Z electrode 3 are formed on the first substrate 1 in a row direction, and the X electrode 4 is formed on the second substrate 1a to cross the Y electrode 2 and the Z electrode 3.

A cell 5 is formed in a point where the respective electrodes cross one another. The Y electrode 2 is a scan electrode and is used for scanning of a screen. The Z electrode 3 is a sustain electrode and is used to sustain discharge. The X electrode 4 is an address electrode and is used for data input.

The X electrode 4 formed in each cell is connected to an X electrode driving circuit and receives an address pulse. The Y electrode 2 is connected to a Y electrode driving circuit and receives a scan pulse. The Z electrode 3 is connected to a Z electrode driving circuit and receives a sustain pulse.

A stripe type barrier and a well type barrier of the related art plasma display panel will be described with reference to the accompanying drawings.

FIG. 2a is a layout showing a stripe type barrier structure of the related art plasma display panel.

First, in the stripe type barrier structure, as shown in FIG. 2a, a plurality of first substrate electrode pairs consisting of Y electrode 11 and Z electrode 12 are formed in a row direction at constant intervals. Stripe type barriers 13 are formed across the first substrate electrode pairs at constant intervals. An X electrode(not shown) is formed in a central portion between the respective barriers. A reference numeral 21 which is not described denotes a discharge region and a reference numeral 22 denotes a main discharge region.

FIG. 2b is a sectional view taken along line I–I' of FIG. 2a, in which the first substrate is rotated by 90°. Referring to FIG. 2b, the first substrate electrode pairs consisting of Y electrode 11 and Z electrode 12 are formed on a first substrate 10. A first dielectric layer 15 is formed on the first substrate 10 including the first substrate electrode pairs. An X electrode 14 is formed on a second substrate 10a to cross the first substrate electrode pairs. The first substrate 10 and the second substrate 10a oppose each other. A second dielectric layer 16 is formed on the second substrate 10a including the X electrode 14. To avoid leakage between adjacent X electrodes, barriers 13 are formed at both sides of the X electrodes at a constant distance from the X electrodes. A phosphor layer 17 is formed on the barriers 13 and the second dielectric layer 16.

As described above, in the stripe type barrier structure, lower sides of the barriers 13 are located at a distance away from the main discharge region 22. Thus, the distance between the main discharge region 22 and the phosphor layer 18 below the barriers 13 is farther than the distance between the main discharge region 22 and the phosphor layer 18 above the X electrode 11. For this reason, loss occurs while ultraviolet rays generated by discharge reach a portion below the barriers.

FIG. 3 is a layout showing a well type barrier structure of the related art plasma display panel.

In the well type barrier structure, arrangement of electrodes are similar to that of FIG. 2a. In FIG. 2a, the barriers are formed only to cross the first substrate electrode pairs. However, in FIG. 3, barriers are formed to cross the first substrate electrode pairs and at the same time horizontal barriers 13a are also formed in a direction where the first substrate electrode pairs are formed.

For reference, the barriers formed to cross the first substrate electrode pairs are called vertical barriers 13 and the barriers formed in the same direction as the first substrate electrode pairs are called horizontal barriers 13a. However, as known from FIG. 3, four corner portions of the discharge region 21 are located at a distance away from the main discharge region 22, even though the well type barriers are formed.

The well type barriers are formed to prevent loss generated when ultraviolet rays by discharge reach a boundary portion of the cell from occurring in the stripe type barriers.

However, the stripe type barrier structure and the well type barrier structure of the related art plasma display panel have following problems.

First, in the stripe type barriers, although exhaust is easy, ultraviolet rays and visible rays may move toward the adjacent cell in vertical direction. In this case, error discharge and crosstalk may occur. Also, since the corner portions of the discharge region are away from the main discharge region, luminance is reduced.

Furthermore, in the well type barriers, although crosstalk between the adjacent cells can be avoided, exhaust is poor. For this reason, error discharge due to remaining gas may occur. Also, in the same manner as the stripe type barriers, since the corner portions of the discharge region are away from the main discharge region, luminance is reduced.

SUMMARY OF THE INVENTION

Accordingly, the present invention is directed to a plasma display panel that substantially obviates one or more of the problems due to limitations and disadvantages of the related art.

An object of the present invention is to provide a plasma display panel which prevents luminance from being reduced in corner portions of a discharge region and improves exhaust ability.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, a plasma display panel according to the first embodiment of the present invention includes a first substrate; a plurality of first substrate electrode pairs formed on the first substrate at constant intervals in one direction; a first dielectric layer formed on the first substrate including the first substrate electrode pairs; a second substrate; a plurality of second substrate electrodes formed on the second substrate at constant intervals to cross the first substrate electrode pairs; a second dielectric layer formed on the second substrate including the second substrate electrodes; first barriers formed on the second dielectric layer with the second substrate electrodes interposed therebetween; auxiliary barriers formed at both sides of the first barriers; a phosphor layer formed on the second dielectric layer including the first barriers; and second barriers formed in a boundary portion of upper and lower discharge cells on the second substrate to have a width which increases toward the first barriers from a central portion and to be separated from the first barriers.

A plasma display panel according to the second embodiment of the present invention includes: a first substrate; a plurality of first substrate electrode pairs formed on the first substrate at constant intervals in one direction; a first dielectric layer formed on the first substrate including the first substrate electrode pairs; a second substrate; a plurality of second substrate electrodes formed on the second substrate at constant intervals to cross the first substrate electrode pairs; a second dielectric layer formed on the second substrate including the second substrate electrodes; barriers formed on the second dielectric layer with the second substrate electrodes interposed therebetween; a phosphor layer formed on the second dielectric layer including the barriers; and a plurality of projections formed on the phosphor layer between the respective barriers at constant intervals in the same direction as the barriers.

A plasma display panel according to the third embodiment of the present invention includes: a first substrate; a plurality of first substrate electrode pairs formed on the first substrate; a second substrate; second substrate electrodes formed on the second substrate to cross the first substrate electrode pairs; a first dielectric layer formed on the second substrate including the second substrate electrodes; barriers formed on the first dielectric layer in first and second directions; and a second dielectric layer formed on the first substrate including the first substrate electrode pairs at a predetermined height, having a groove of a predetermined width and depth in the first and second directions on a surface region.

A plasma display panel according to the fourth embodiment of the present invention includes: a first substrate; a plurality of first substrate electrode pairs formed on the first substrate at constant intervals in one direction; a second substrate; a plurality of second substrate electrodes formed on the second substrate at constant intervals to cross the first substrate electrode pairs; first barriers formed on the second substrate with the second substrate electrodes interposed therebetween; and at least two or more second barriers formed in a boundary portion of upper and lower discharge cells on the second substrate to be separated from the first barriers and to maintain predetermined intervals among one another.

A plasma display panel according to the fourth embodiment of the present invention includes: a first substrate; a plurality of first substrate electrode pairs formed on the first substrate at constant intervals in one direction; a second substrate; a plurality of second substrate electrodes formed on the second substrate at constant intervals to cross the first substrate electrode pairs; first barriers formed on the second substrate with the second substrate electrodes interposed therebetween; and second barriers formed in a boundary portion of upper and lower discharge cells on the second substrate to be separated from the first barriers and to have a width of a surface opposite to the first barriers, which increases at a constant ratio or more than a width of the first barriers.

It is to be understood that both the foregoing general description and the following detailed description are exemplary and explanatory and are intended to provide further explanation of the invention as claimed.

BRIEF DESCRIPTION OF THE DRAWINGS

The invention will be described in detail with reference to the following drawings in which like reference numerals refer to like elements wherein:

FIG. 2b is a sectional view taken along line I–I' of FIG. 2a;

FIG. 4b is a perspective view showing a barrier structure of FIG. 4a;

FIG. 5 is a sectional view taken along line I–I' of FIG. 4a;

DETAILED DESCRIPTION OF THE PREFERRED EMBODIMENTS

Reference will now be made in detail to the preferred embodiments of the present invention, examples of which are illustrated in the accompanying drawings.

First Embodiment

Figure 1:
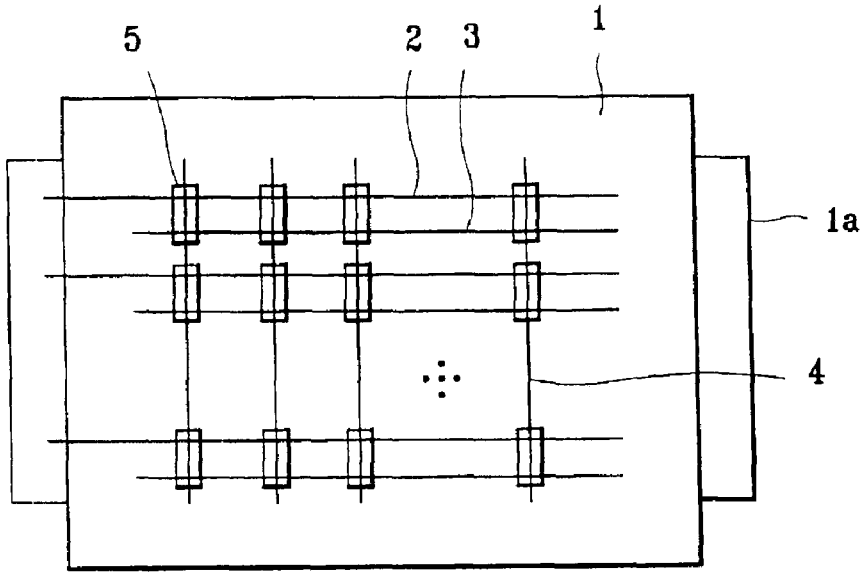
FIG.1 background art
FIG. 1 is a layout of a general AC type plasma display panel of three-electrode area discharge type.
Figure 2A:
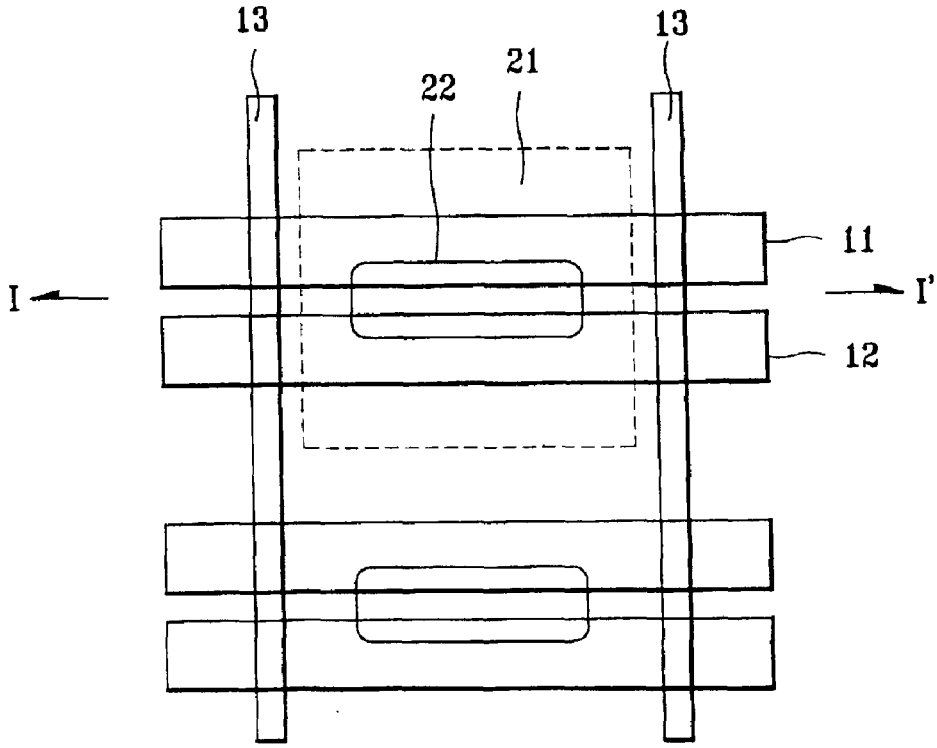
FIG.2a background art
FIG. 2a is a layout of a related plasma display panel having a stripe type barrier structure.
Figure 2B:
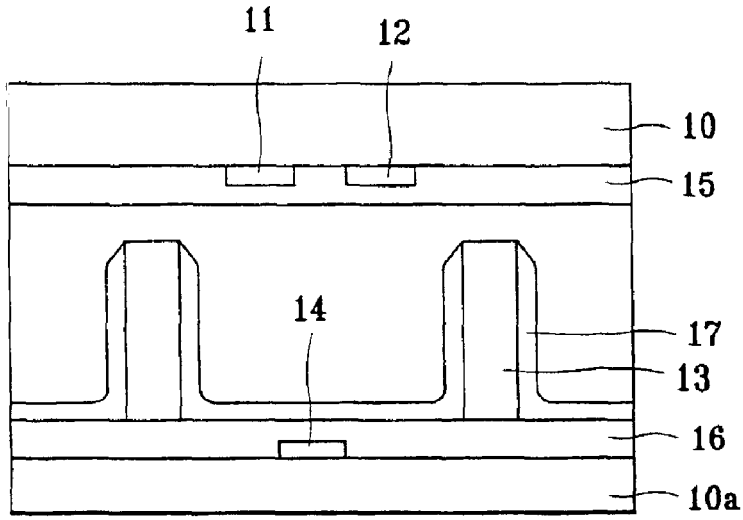
FIG.2b background art
Figure 3:
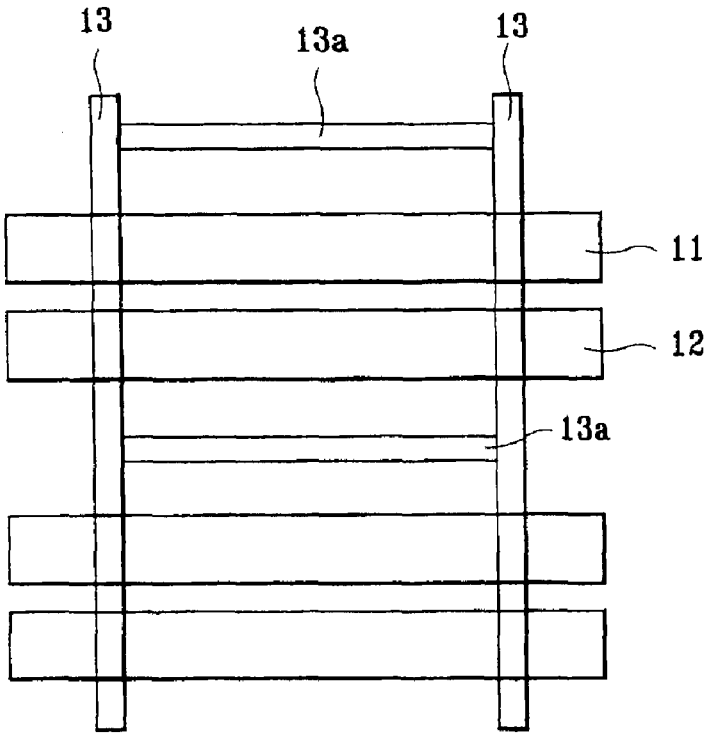
FIG.3 background art
FIG. 3 is a layout of a related art plasma display panel having a well type barrier structure.
Figure 4A:
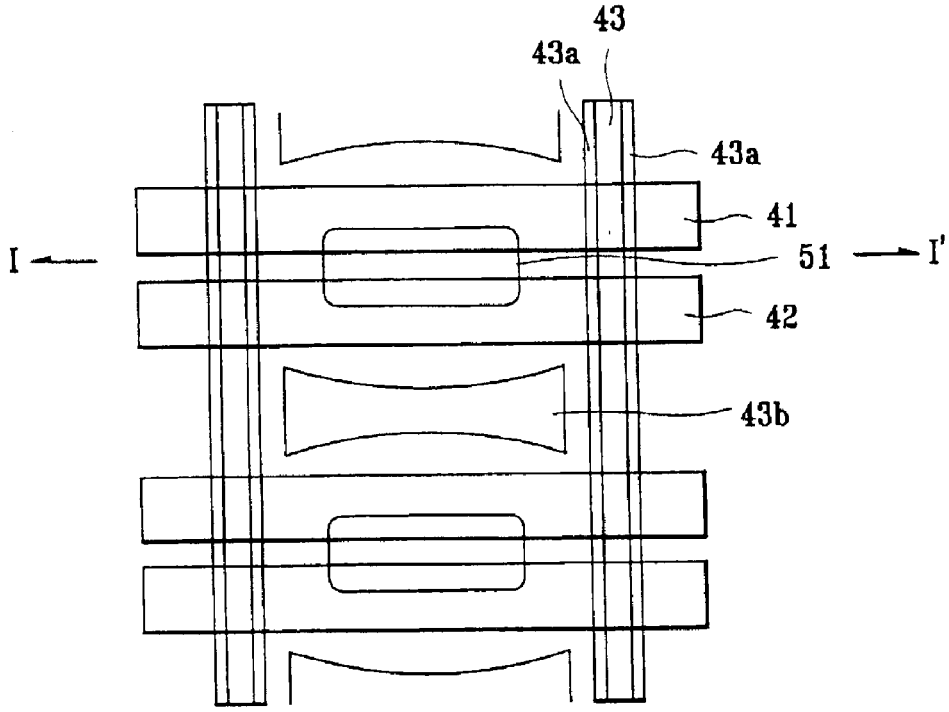
FIG. 4a is a layout of a plasma display panel according to the first embodiment of the present invention.
Figure 4B:
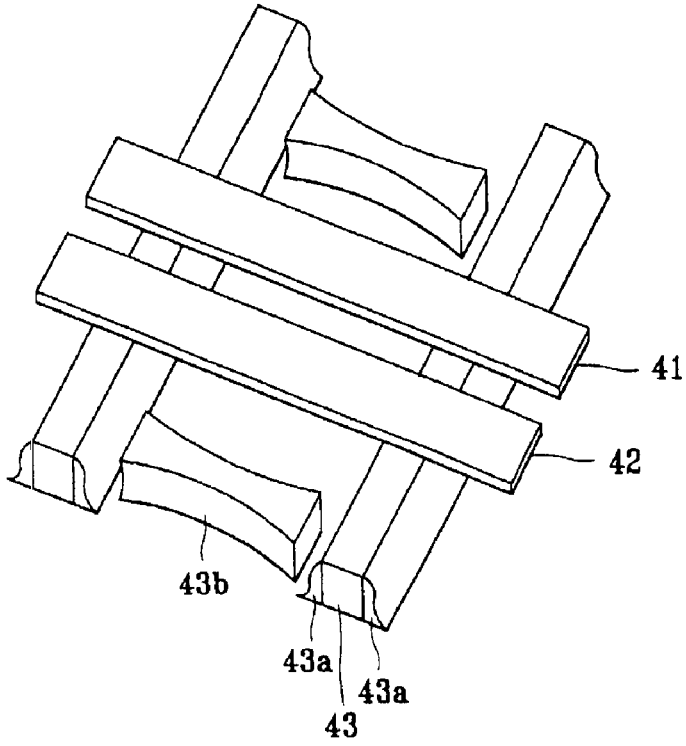

As shown in FIGS. 4a and 4b, a plasma display panel according to the first embodiment of the present invention includes first substrate electrode pairs (sustain electrodes) consisting of Y electrode 41 and Z electrode 42, formed on a first substrate in one direction, first barriers 43 formed on a second substrate at constant intervals to cross the first substrate electrode pairs, auxiliary barriers 43a formed at both sides of the first barriers 43, and second barriers 43b formed on the second substrate corresponding to a region between the respective first substrate electrode pairs. The second barriers 43b have a width which increases toward the first barriers and are symmetrical toward the first substrate electrode pairs at their adjacent both sides. A reference numeral 51 which is not described denotes a main discharge region.

Figure 5:
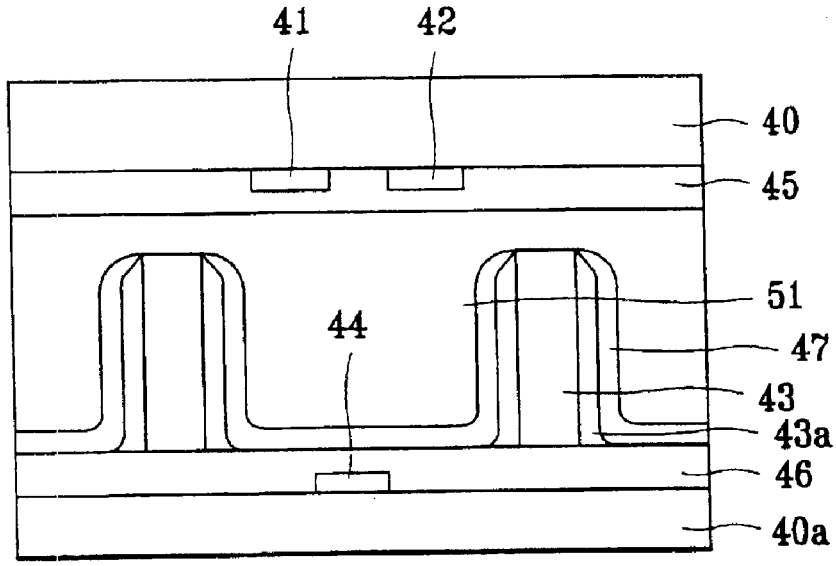

As described above, both sides of the second barriers 43b are separated from adjacent first barriers 43 without closely contacting each other, so that a path is formed. This path is used as an exhaust path to maximize exhaust ability. The main discharge region 51 can be obtained to the maximum range depending on shapes of the second barriers 43b. Also, as shown in FIG. 5 showing a sectional view taken along line I–I' of FIG. 4a (first substrate is rotated by 90°), the auxiliary barriers 43a having a greater width at a lower portion than an upper portion are formed at both sides of the first barriers 43. Thus, an edge portion below the first barriers 43 can be approximated to the main discharge region to the maximum range.

A reference numeral 40 which is not described denotes the first substrate, 40a denotes the second substrate, 44 denotes an X electrode, 45 and 46 denote dielectric layers, and 47 denotes a phosphor layer.

Figure 6:
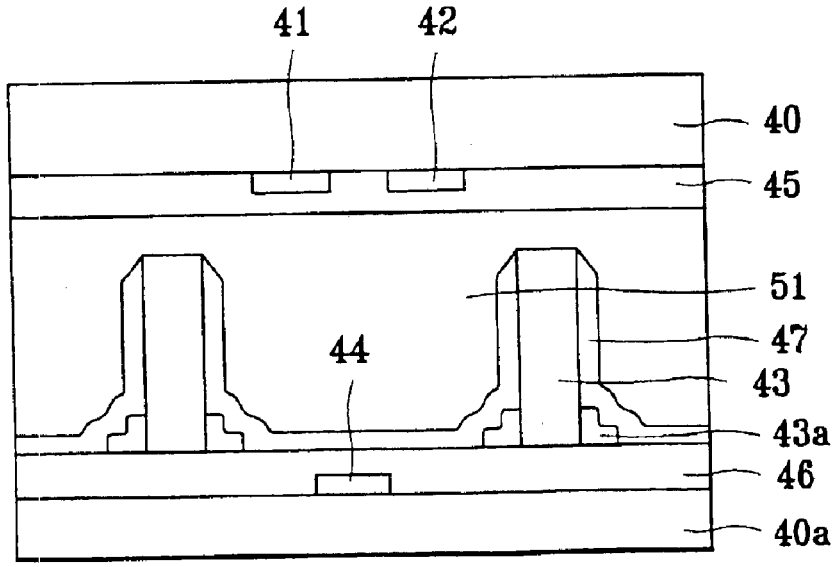
FIG. 6 shows another embodiment of auxiliary barriers according to the present invention.

Also, as shown in FIG. 6, unlike the auxiliary barriers 43a of FIG. 5, auxiliary barriers 43a having a predetermined height and width may be formed at two stages at only both edge portions below the first barriers 43, so that the edge portions can be more approximated to the main discharge region 51.

Figure 7A:
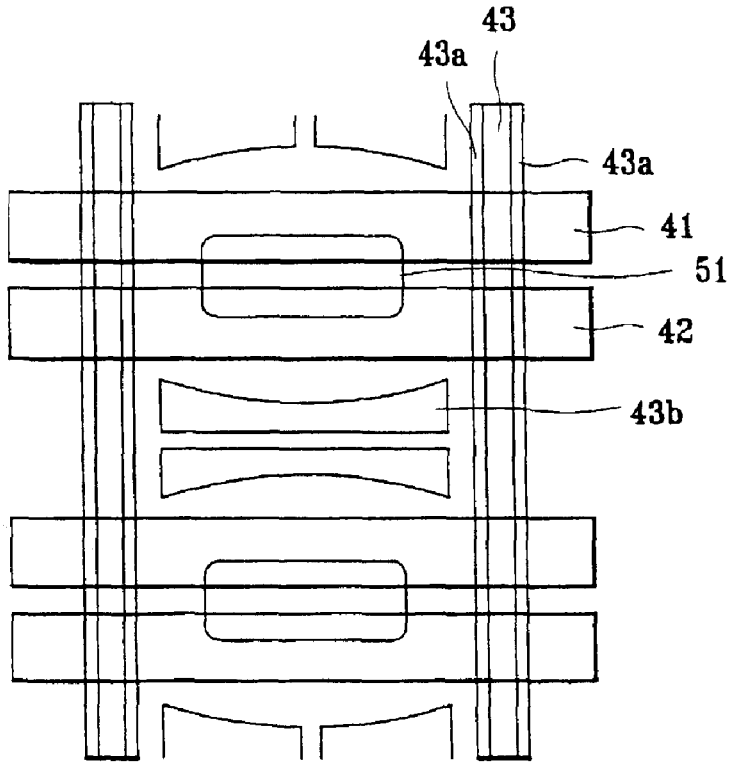
FIGS. 7a to 7c show another embodiment of second barriers according to the present invention.
Figure 7B:
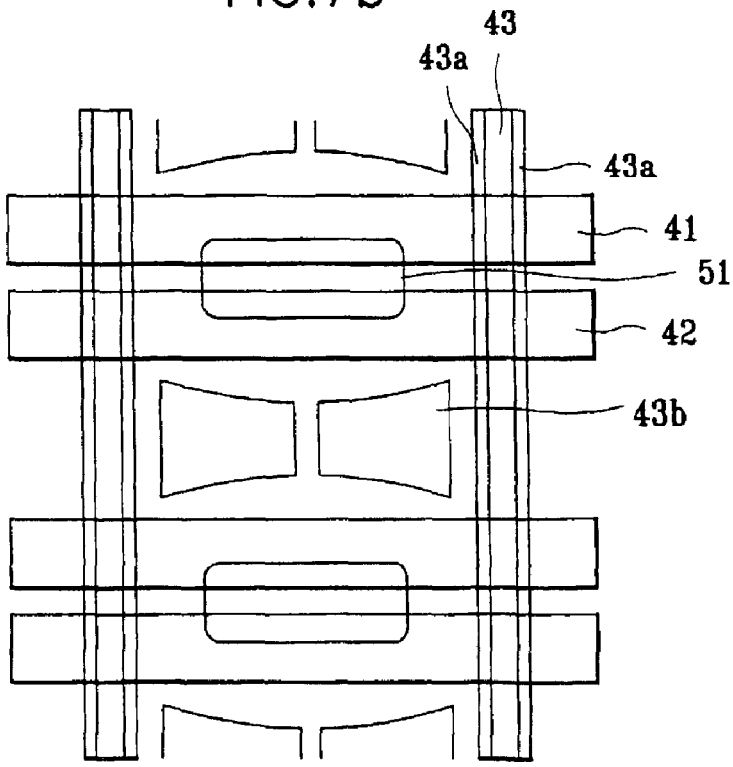
Figure 7C:
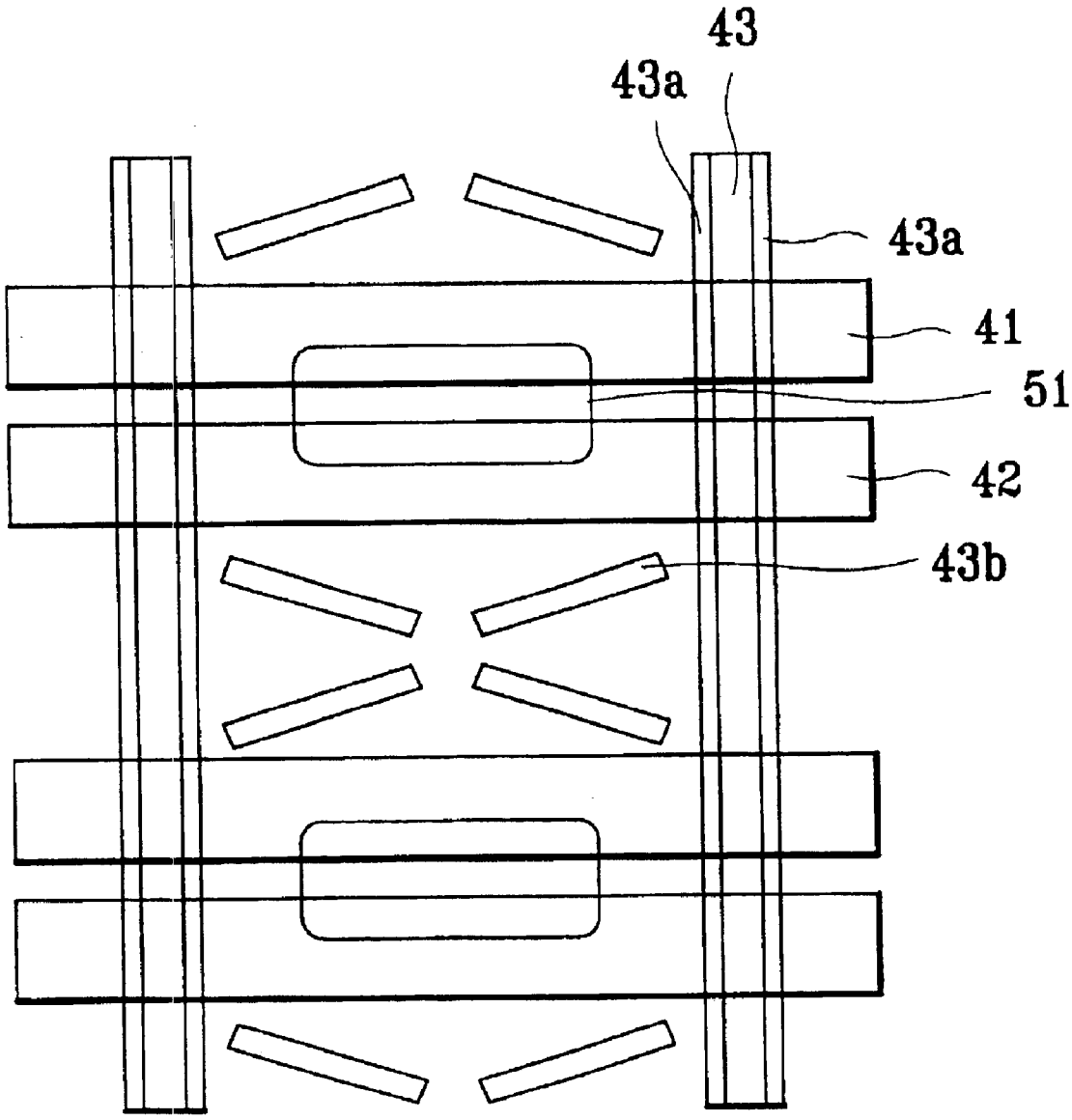

Meanwhile, FIGS. 7a to 7c show embodiments of the second barriers 43b. In FIG. 7a, a central portion of the second barriers 43b shown in FIGS. 4a and 4b is separated by X axis. In FIG. 7b, a central portion of the second barriers 43b shown in FIGS. 4a and 4b is separated by Y axis. In FIG. 7c, the second barriers 43b shown in FIGS. 4a and 4b are separated by X and Y axes.

At this time, in the embodiments of the second barriers 43a shown in FIGS. 7a to 7c, the exhaust path is ensured to the maximum range to improve exhaust ability.

As described above, the plasma display panel according to the first embodiment of the present invention has the following advantages.

First, the barriers are formed in horizontal and vertical directions of the main discharge region to approximate to the edge portions below the main discharge region to the maximum range. Accordingly, ultraviolet rays generated by discharge are prevented from being erased while reaching the edge portions below the barriers, thereby improving luminance.

Furthermore, the vertical barriers are separated from the horizontal barriers and the horizontal barriers are again separated from one another to ensure an exhaust path, thereby improving exhaust ability.

Second Embodiment

Figure 8:
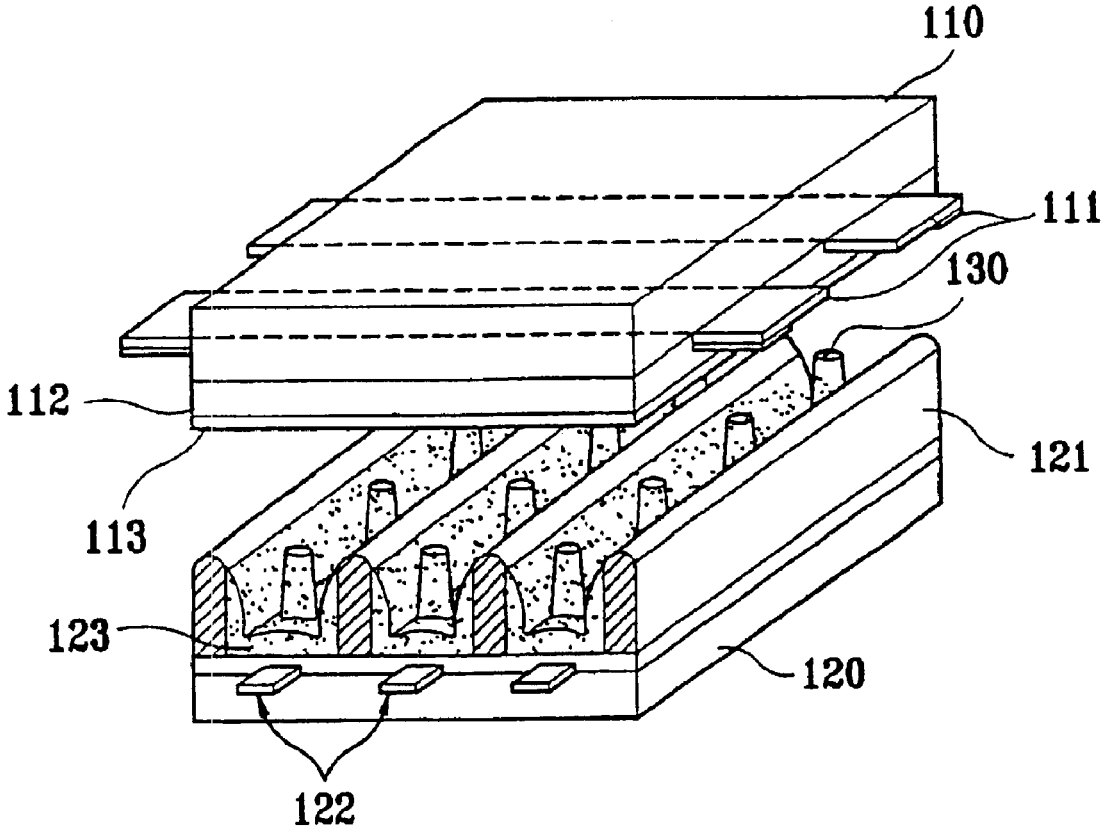
FIG. 8 is an exploded perspective view showing a plasma display panel according to the second embodiment of the present invention.

As shown in FIG. 8, a plasma display panel according to the second embodiment of the present invention includes a first substrate 110 and a second substrate 120 which are combined with each other in parallel at a constant interval.

First substrate electrode pairs(sustain electrodes) 111 for sustaining light-emission of the cell are formed below the first substrate 110. A black matrix is provided between the first substrate 110 and the first substrate electrode pairs 111. The first substrate electrode pairs 111 and the black matrix are sealed by a dielectric layer 112 and a passivation layer 113 formed by plasticity.

Stripe type barriers 121 on which a phosphor layer 123 is deposited are formed on the second substrate 120. A plurality of projections 130 are formed between the barriers 121 at constant intervals. At this time, the projections 130 are preferably arranged between the barriers 121 corresponding to the boundary portion between the cells. A top portion at both sides of the projections 130 should be separated from inner sides of the barriers 21. It is preferable that both sides of a lower portion of the projections 130 are separated from the inner sides of the barriers 121. However, both sides of the lower portion of the projections 130 may be mounted in the inner sides of the barriers 121.

Figure 9:
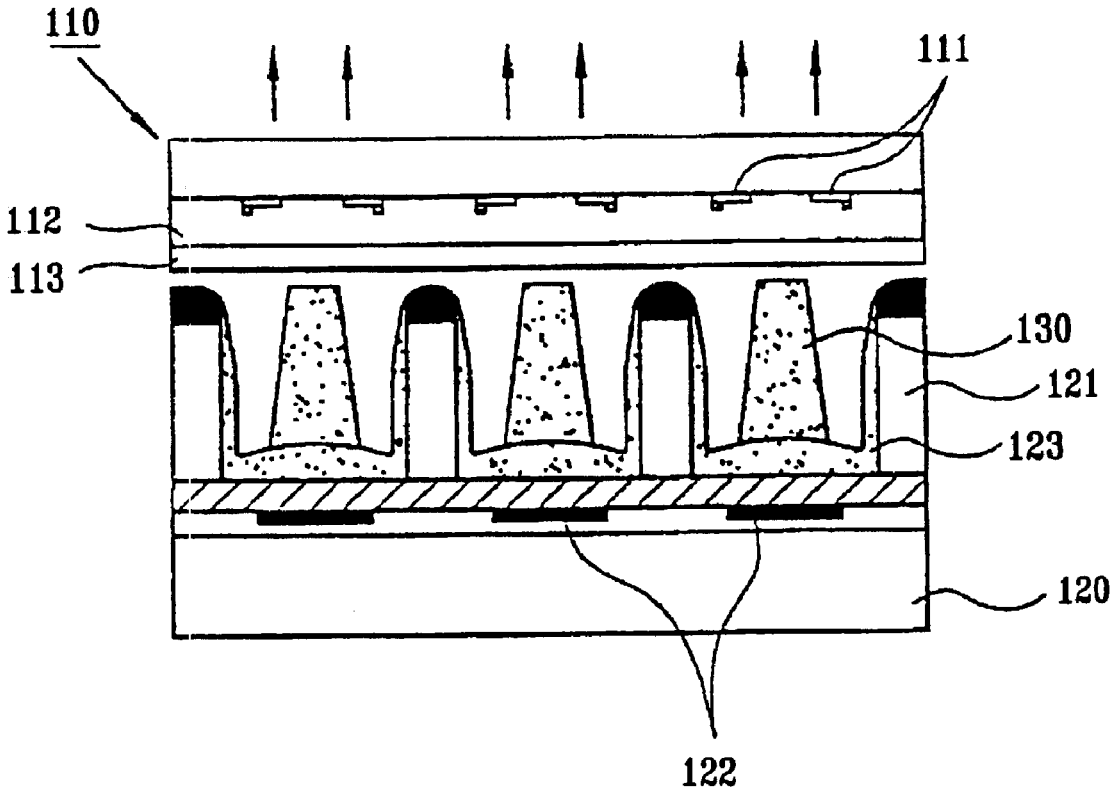
FIG. 9 is a sectional view showing an assembly state of FIG. 8.

Also, the projections 130 are preferably formed to have a sectional width which becomes narrow toward an upper portion from a lower portion. Namely, as shown in FIG. 9 showing a combined section of the first substrate 110 and the second substrate 120, the projections 130 are formed in a conical shape.

Figure 10:
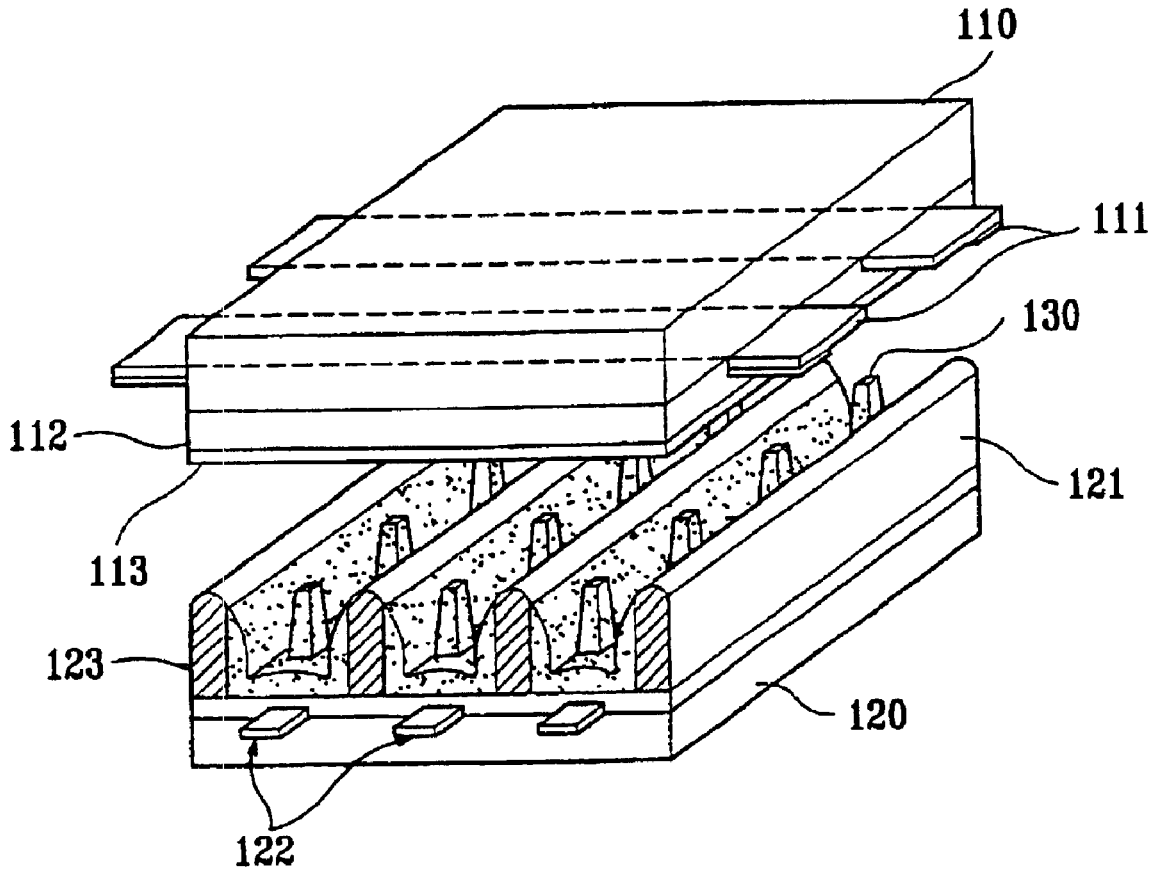
FIG. 10 is an exploded perspective view showing another projection shape of FIG. 8.

Meanwhile, the projections 130, as shown in FIG. 10, may have a hexagonal shape. Alternatively, the projections 130 may have a polygonal shape such as a triangle shape (not shown). A reference numeral 122 which is not described denotes a second substrate electrode (address electrode).

The plasma display panel according to the second embodiment of the present invention is similar to a general configuration except for the projections 130. Accordingly, advantages of the plasma display panel according to the second embodiment of the present invention will be described based on the projections 130.

In a state that the first substrate 110 and the second substrate 120 are temporarily sealed, remaining gas of atmospheric pressure state is removed before filling a discharge gas.

At this time, the projections 130 are arranged between the barriers 121. The top and lower portions of the projections 130 are separated from the inner sides of the barriers 121. Accordingly, the remaining gas is smoothly exhausted and the exhaust process time is shortened.

Furthermore, ultraviolet rays and visible rays are prevented from freely moving to a neighboring cell by the projections 130 as the projections 130 are mounted in the boundary portion of each cell. This increases luminance and efficiency and improves contrast.

Third Embodiment

Figure 11:
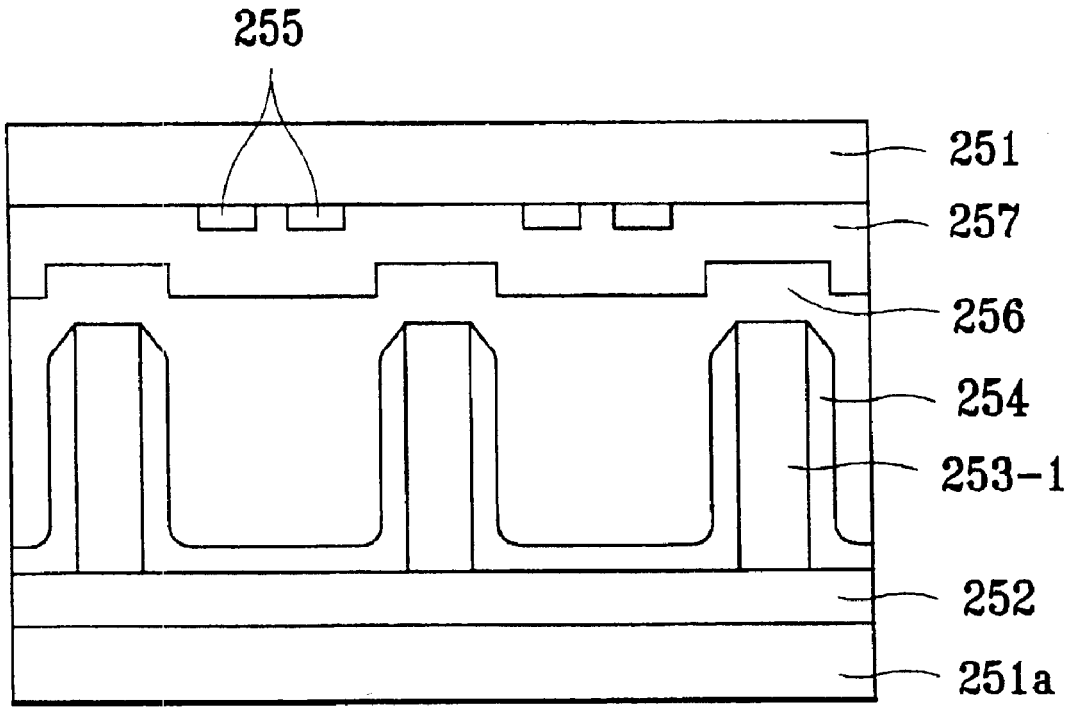
FIGS. 11 to 14 are sectional views showing a plasma display panel according to the third embodiment of the present invention.

As shown in FIG. 11, a plasma display panel according to the third embodiment of the present invention includes a first substrate 251, a second substrate 251a, a plurality of first substrate electrode pairs 255 formed on the first substrate 251 at constant intervals, second substrate electrodes 259 (not shown) formed on the second substrate 251a, a second dielectric layer 252 formed on the second substrate 251a including the second substrate electrodes 259, lattice shaped barriers 253(253-1, 253-2) formed on the second dielectric layer 252 to cross in horizontal and vertical directions, a phosphor layer 254 formed on the second dielectric layer 252 including the barriers 253(253-1, 253-2), and a first dielectric layer 257 formed on an entire surface of the first substrate 251 including the first substrate electrode pairs 255, having a groove 256 of a predetermined depth in a region corresponding to vertical barriers 253-1 among the barriers 253(253-1, 253-2) along a direction in which the first substrate electrode pairs 255 are formed. The groove 256 is wider than the vertical barriers 253-1.

As described above, the plasma display panel according to the third embodiment of the present invention has the groove 256 formed in a region of the first dielectric layer 257 corresponding to the vertical barriers 253-1 in the same direction as the first substrate electrode pairs 255.

Figure 12:
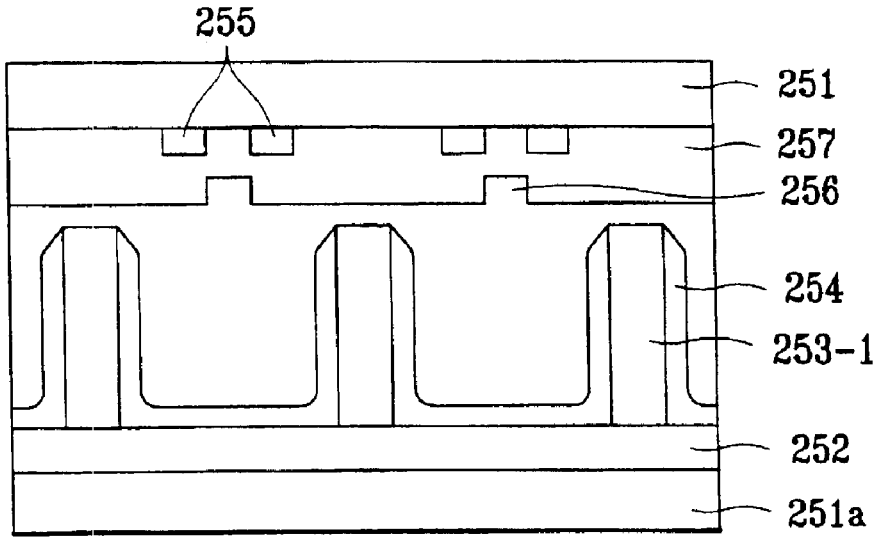
Figure 13:
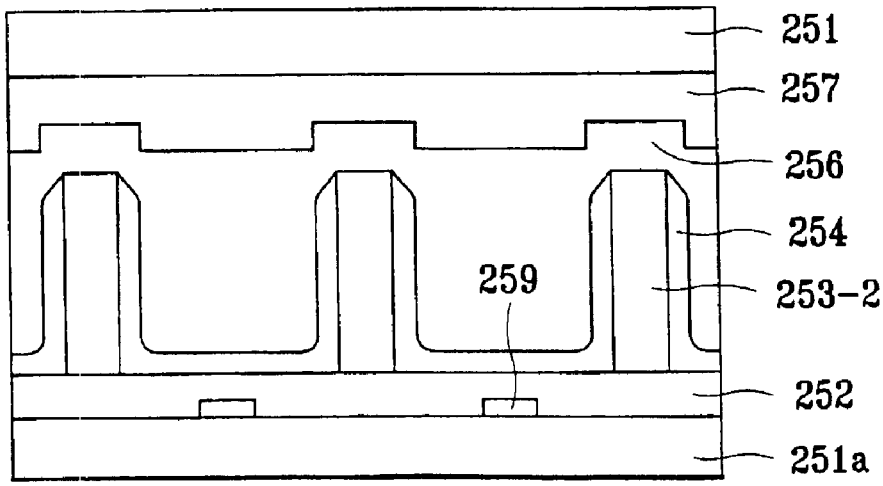
Figure 14:
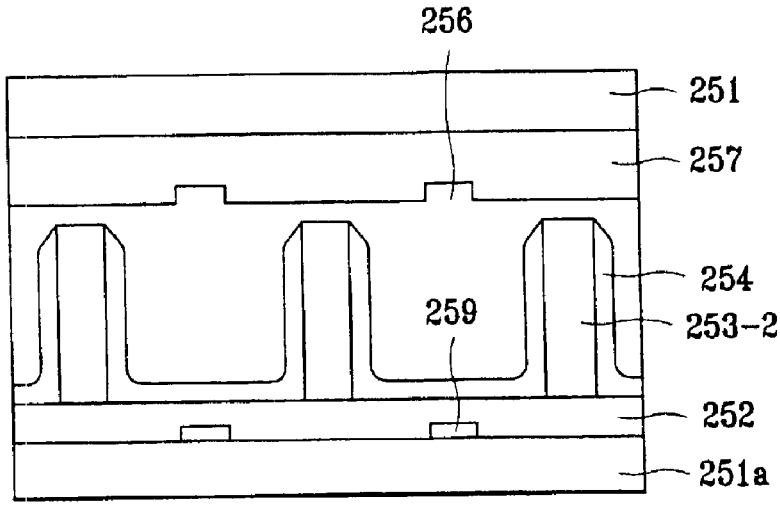

Meanwhile, in the plasma display panel according to the third embodiment of the present invention, position of the groove may be varied as shown in FIGS. 12 to 14.

As shown in FIG. 12, the groove 256 is formed in a corresponding region of the first dielectric layer 257 between the vertical barriers 253-1 in the same direction as the first substrate electrode pairs 255.

As shown in FIG. 13, the groove 256 is formed in a region of the first dielectric layer 257 corresponding to horizontal barriers 253-2. The groove 256 is formed in the same direction as the second substrate electrode pairs 259 to cross the first substrate electrode pairs. At this time, the first substrate electrode pairs 255 of FIG. 12 are not shown in FIG. 13 because FIG. 13 is a sectional view based on the horizontal barriers 253-2.

Next, as shown in FIG. 14, the groove 256 is formed in a corresponding region of the first dielectric layer 257 between the horizontal barriers 253-2. The groove 256 is formed in the same direction as the second substrate electrodes 259 to cross the first substrate electrode pairs 255.

At this time, the first substrate electrode pairs 255 of FIG. 12 are not shown in FIG. 14 because FIG. 14 is a sectional view based on the horizontal barriers 253-2.

In addition to the aforementioned embodiment, based on FIGS. 11 and 13, the groove may be formed in a region of the first dielectric layer corresponding to the vertical barriers in the same direction as the first substrate electrode pairs, and the groove may be formed in a region of the first dielectric layer corresponding to the horizontal barriers in the same direction as the second substrate electrode pairs to cross the first substrate electrode pairs.

Alternatively, based on FIGS. 12 and 14, the groove may be formed in a corresponding region of the first dielectric layer between the vertical barriers in the same direction as the first substrate electrode pairs, and the groove may be formed in a corresponding region of the first dielectric layer between the horizontal barriers in the same direction as the second substrate electrode pairs to cross the first substrate electrode pairs.

As described above, the plasma display panel according to the third embodiment of the present invention has the following advantages.

First, since the lattice shaped barriers are formed, crosstalk between adjacent cells and error discharge can be avoided. Second, exhaust ability can be improved by ensuring an exhaust path, and exhaust time can be shortened. Third, since the groove is formed in the dielectric layer, the thickness of the dielectric layer can be reduced to increase transmittivity. Thus, the plasma display panel of high luminance and high efficiency can be obtained. Finally, since electric field is converged to a portion where the groove is formed, a discharge start voltage can be lowered.

Fourth Embodiment

Figure 15:
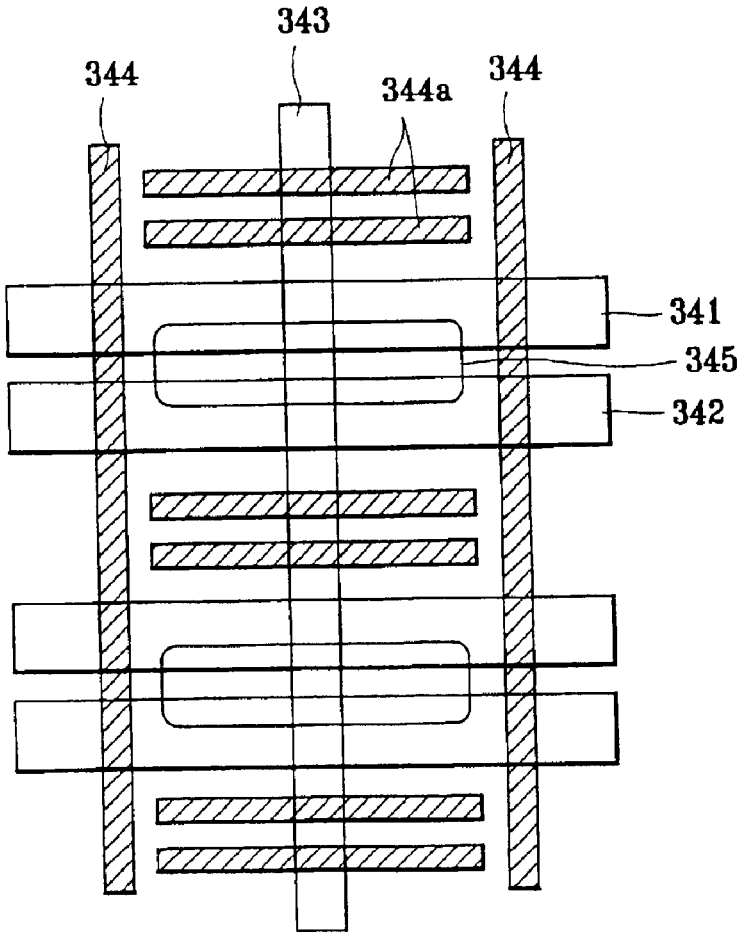
FIGS. 15 to [18] *17* are layouts showing a plasma display panel according to the fourth embodiment of the present invention.

As shown in FIG. 15, a plasma display panel according to the fourth embodiment of the present invention includes first substrate electrode pairs 341 and 342 formed on a first substrate in one direction, second substrate electrodes (address electrodes) 343 formed to cross the first substrate electrode pairs 341 and 342, first barriers 344 formed at both sides with a cell region interposed therebetween, the cell region being defined on a region where the first substrate electrode pairs 341 and 342 cross the second substrate electrodes 343, and a plurality of second barriers 344a formed in upper and lower sides of the cell region with the cell region interposed therebetween to be separated from the first substrates 344. A reference numeral 345 which is not described denotes a main discharge region.

At this time, as shown in FIG. 15, the second barriers 344a are formed in the same direction as the first substrate electrode pairs 341 and 342. Alternatively, [as shown in FIG. 16,] at least two or more the second barriers 344a are formed to be separated at a constant distance in the same direction as the first barriers 344.

Accordingly, the first barriers 344 are separated from the second barriers 344a to form an exhaust path. The second barriers 344a can prevent crosstalk that may occur between adjacent cells due to charge particles from occurring.

Meanwhile, in FIGS. [17 and 18] *16 and 17*, the barriers are formed in a boundary portion between the cells to have a greater width than those of [FIGS. 15 and 16] *FIG. 15*, so that contrast can be improved and at the same time an exhaust path can be obtained. In a typical plasma display panel, a black matrix is formed to improve contrast. The barriers may be applied to a plasma display panel having no black matrix.

Namely, as shown in FIG. [17] *16*, the first barriers 344 are formed to cross the first substrate electrode pairs 341 and 342, and at the same time the second barriers 344a are formed in a boundary portion between upper and lower cells between the first barriers 344 to have a width increased by a predetermined ratio(about two times) as compared with the first barriers 344. Thus, exhaust ability and contrast can be improved.

Furthermore, as shown in FIG. [18] *17*, a portion of the second barriers 344a opposite to the cell has a first width, and its central portion having a second width of H shape smaller than the first width. At this time, the first width is two times or more of the second width. Consequently, if the barriers are formed as shown in FIG. [17] *16*, contrast is more effective. If the barriers are formed as shown in FIG. [18] *17*, exhaust ability is more effective.

The plasma display panel according to the fourth embodiment of the present invention has the following advantages.

Since a plurality of the horizontal barriers having an exhaust path are formed, exhaust ability can be improved, and crosstalk and error discharge can be prevented from occurring. Furthermore, since the horizontal barriers have a greater width, contrast can be improved in the plasma display panel having no black matrix layer as well as the plasma display panel having a black matrix layer.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A plasma display panel comprising:

a first substrate;

a plurality of first substrate electrode pairs formed on the first substrate at constant intervals in one direction;

a first dielectric layer formed on the first substrate including the first substrate electrode pairs;

a second substrate;

a plurality of second substrate electrodes formed on the second substrate at constant intervals to cross the first substrate electrode pairs;

a second dielectric layer formed on the second substrate including the second substrate electrodes;

first barriers formed on the second dielectric layer with the second substrate electrodes interposed therebetween;

auxiliary barriers formed at both sides of the first barriers;

a phosphor layer formed on the second dielectric layer including the first barriers; and second barriers formed in a boundary portion of upper and lower discharge cells on the second substrate to have a width which increases toward the first barriers from a central portion and to be separated from the first barriers.

2. A plasma display panel of claim 1, wherein the auxiliary barriers have a greater lower area than an upper area at both sides of the first barriers.

3. A plasma display panel of claim 2, wherein the auxiliary barriers are formed at both sides of the first barriers in a round shape.

4. A plasma display panel of claim 1, wherein the auxiliary barriers are layered on a lower portion of both sides of the first barriers at a predetermined height and width.

5. A plasma display panel of claim 1, wherein the second barriers have a greater width toward a lower portion.

6. A plasma display panel of claim 1, wherein the second barriers have a round shape at a surface opposite to the first substrate electrode pairs.

7. A plasma display panel of claim 1, wherein the second barriers are separated at their central portion by X axis, Y axis, or X and Y axes.

8. A plasma display panel comprising:

a first substrate;

a plurality of first substrate electrode pairs formed on the first substrate at constant intervals in one direction;

a second substrate;

a plurality of second substrate electrodes formed on the second substrate at constant intervals to cross the first substrate electrode pairs;

first barriers formed on the second substrate with the second substrate electrodes interposed therebetween; and at least two or more second barriers formed in a boundary portion of upper and lower discharge cells on the second substrate to be separated from the first barriers and to maintain predetermined intervals among one another.

9. A plasma display panel of claim 8, wherein the second barriers are formed in the same direction as the first substrate electrode pairs.

10. A plasma display panel of claim 8, wherein the second barriers are formed in the same direction as the first barriers.

11. A plasma display panel of claim 8, wherein the second barriers have either a horizontal width or a vertical width equivalent to the first barriers.

12. A plasma display panel comprising:

a first substrate;

a plurality of first substrate electrode pairs formed on the first substrate at constant intervals in one direction;

a second substrate;

a plurality of second substrate electrodes formed on the second substrate at constant intervals to cross the first substrate electrode pairs;

first barriers formed on the second substrate with the second substrate electrodes interposed therebetween; and second barriers formed in a boundary portion of upper and lower discharge cells on the second substrate to be separated from the first barriers and to have a width of a surface opposite to the first barriers, which increases at a constant ratio or more than a width of the first barriers.

13. A plasma display panel of claim 12, wherein the second barriers have concave and convex portions on a surface opposite to the first barriers.

*14. A plasma display panel (PDP), comprising:*

*a substrate;*

*at least one electrode arranged on the substrate;*

*at least one first barrier formed on the substrate parallel to the at least one electrode;*

*at least one second barrier formed on the substrate perpendicular to the at least one electrode;*

*a phosphor layer formed over the at least one electrode, wherein at least one side of the first barrier, and at least one side of the second barrier are configured to perform light emission, wherein a thickness of a top portion of the first barrier is less than a thickness of a bottom portion of the first barrier, and wherein a thickness of at least one of longitudinal end portions of the second barrier adjacent to the at least one first barrier is greater than a thickness of a middle portion of the second barrier.*

*15. The plasma display panel of claim 14, wherein at least one portion of the side of the first barrier is sloped such that an effective light-emitting surface area of the phosphor layer that receives ultraviolet rays is increased.*

*16. The plasma display panel of claim 15, wherein at least one of top and bottom portions of the side of the first barrier is sloped.*

*17. The plasma display panel of claim 15, wherein an entire portion of the side of the first barrier is sloped.*

*18. The plasma display panel of claim 14, wherein at least one portion of the side of the first barrier is faced toward ultraviolet rays such that an effective light-emitting surface area of the phosphor layer that receives the ultraviolet rays is increased.*

*19. The plasma display panel of claim 18, wherein at least one of top and bottom portions of the side of the first barrier is faced toward the ultraviolet rays.*

*20. The plasma display panel of claim 18, wherein an entire portion of the side of the first barrier is faced toward the ultraviolet rays.*

*21. A plasma display panel (PDP), comprising:*

*a substrate;*

*at least one electrode arranged on the substrate;*

*at least one first barrier formed on the substrate;*

*at least one second barrier formed on the substrate; and*

*a phosphor layer formed over the at least one electrode, wherein at least one side of the first barrier, and at least*

*one side of the second barrier are configured to perform light emission, wherein a thickness of a top portion of the first barrier is less than a thickness of a bottom portion of the first barrier, and wherein a thickness of at least one of longitudinal end portions of the second barrier adjacent to the at least one first barrier is greater than a thickness of a middle portion of the second barrier.*

*22. The plasma display panel of claim 21, wherein at least one portion of the side of the first barrier is sloped such that an effective light-emitting surface area of the phosphor layer that receives ultraviolet rays is increased.*

*23. The plasma display panel of claim 22, wherein at least one of top and bottom portions of the side of the first barrier is sloped.*

*24. The plasma display panel of claim 22, wherein an entire portion of the side of the first barrier is sloped.*

*25. The plasma display panel of claim 21, wherein at least one portion of the side of the first barrier is faced toward ultraviolet rays such that an effective light-emitting surface area of the phosphor layer that receives the ultraviolet rays is increased.*

*26. The plasma display panel of claim 25, wherein at least one of top and bottom portions of the side of the first barrier is faced toward the ultraviolet rays.*

*27. The plasma display panel of claim 25, wherein an entire portion of the side of the first barrier is faced toward the ultraviolet rays.*

*28. The plasma display panel of claim 21, wherein the at least one first barrier is substantially parallel to the at least one electrode.*

*29. The plasma display panel of claim 21, wherein the at least one second barrier is substantially perpendicular to the at least one electrode.*

*30. The plasma display panel of claim 21, wherein the at least one first barrier is substantially perpendicular to the at least one second barrier.*

*31. A plasma display panel (PDP), comprising:*

*a substrate;*

*at least one electrode arranged on the substrate;*

*at least one first barrier formed on the substrate substantially perpendicular to the at least one electrode;*

*at least one second barrier formed on the substrate substantially parallel to the at least one electrode; and*

*a phosphor layer formed over the at least one electrode, wherein at least one side of the first barrier, and at least one side of the second barrier are configured to perform light emission, wherein a thickness of a top portion of the first barrier is less than a thickness of a bottom portion of the first barrier, and wherein a thickness of at least one of longitudinal end portions of the second barrier adjacent to the at least one first barrier is greater than a thickness of a middle portion of the second barrier.*

*32. The plasma display panel of claim 31, wherein at least one portion of the side of the first barrier is sloped such that an effective light-emitting surface area of the phosphor layer that receives ultraviolet rays is increased.*

*33. The plasma display panel of claim 32, wherein at least one of top and bottom portions of the side of the first barrier is sloped.*

*34. The plasma display panel of claim 32, wherein an entire portion of the side of the first barrier is sloped.*

*35. The plasma display panel of claim 31, wherein at least one portion of the side of the first barrier is faced toward ultraviolet rays such that an effective light-emitting surface area of the phosphor layer that receives the ultraviolet rays is increased.*

*36. The plasma display panel of claim 35, wherein at least one of top and bottom portions of the side of the first barrier is faced toward the ultraviolet rays.*

*37. The plasma display panel of claim 35, wherein an entire portion of the side of the first barrier is faced toward the ultraviolet rays.*

*38. An AC-type plasma display panel (PDP), comprising:*

*a first substrate;*

*at least one pair of scan and sustain electrodes arranged on the first substrate;*

*a first dielectric layer formed over the at least one pair of scan and sustain electrodes;*

*a second substrate;*

*at least one address electrode arranged on the second substrate substantially perpendicular to the at least one pair of scan and sustain electrodes;*

*a second dielectric layer formed over the at least one address electrode;*

*at least one first barrier formed on the second substrate;*

*at least one second barrier formed on the second substrate; and*

*a phosphor layer formed over an exposed portion of the second dielectric layer, at least one side of the first barrier, and at least one side of the second barrier in order to perform light emission, wherein a thickness of a top portion of the first barrier is less than a thickness of a bottom portion of the first barrier, and wherein a thickness of at least one of left and right end portions of the second barrier adjacent to the at least one first barrier is greater than a thickness of a middle portion of the second barrier.*

*39. The AC-type plasma display panel of claim 38, wherein at least one portion of the side of the first barrier is sloped such that an effective light-emitting surface area of the phosphor layer that receives ultraviolet rays is increased.*

*40. The AC-type plasma display panel of claim 39, wherein at least one of top and bottom portions of the side of the first barrier is sloped.*

*41. The AC-type plasma display panel of claim 39, wherein an entire portion of the side of the first barrier is sloped.*

*42. The AC-type plasma display panel of claim 38, wherein at least one portion of the side of the first barrier is faced toward ultraviolet rays such that an effective light-emitting surface area of the phosphor layer that receives the ultraviolet rays is increased.*

*43. The AC-type plasma display panel of claim 42, wherein at least one of top and bottom portions of the side of the first barrier is faced toward the ultraviolet rays.*

*44. The AC-type plasma display panel of claim 42, wherein an entire portion of the side of the first barrier is faced toward the ultraviolet rays.*

*45. The AC-type plasma display panel of claim 38, wherein the at least one first barrier is substantially parallel to the at least one address electrode.*

*46. The AC-type plasma display panel of claim 38, wherein the at least one second barrier is substantially perpendicular to the at least one address electrode.*

*47. The AC-type plasma display panel of claim 38, wherein the at least one first barrier is substantially perpendicular to the at least one second barrier.*

* * * * *